United States Patent [19]

Boiarski et al.

[11] Patent Number: 5,595,065
[45] Date of Patent: Jan. 21, 1997

[54] CLOSED CYCLE CRYOGENIC REFRIGERATION SYSTEM WITH AUTOMATIC VARIABLE FLOW AREA THROTTLING DEVICE

[75] Inventors: Michael Boiarski, Moscow, Russian Federation; Ralph C. Longsworth, Allentown, Pa.; Boris Yudin, Moscow, Russian Federation; Dennis H. Hill, Pottstown, Pa.; Lawrence A. Klusmier, Germansville, Pa.; Ajay N. Khatri, Bethlehem, Pa.; Anthony L. Owoc, Harleysville, Pa.

[73] Assignee: APD Cryogenics, Allentown, Pa.

[21] Appl. No.: 499,259

[22] Filed: Jul. 7, 1995

[51] Int. Cl.⁶ .................................. F25B 41/00
[52] U.S. Cl. .................. 62/222; 62/51.2; 236/92 B
[58] Field of Search .................. 62/51.2, 222, 223, 62/224, 511, 528; 236/92 B, 93 R, 101 R

[56] References Cited

U.S. PATENT DOCUMENTS

| | | | |
|---|---|---|---|
| 3,517,525 | 6/1970 | Campbell | 62/222 |
| 3,640,091 | 2/1972 | Buller et al. | 62/514 |
| 3,728,868 | 4/1973 | Longsworth | 62/222 |
| 3,800,551 | 4/1974 | Weibel, Jr. et al. | 62/217 |
| 3,827,252 | 8/1974 | Chovet et al. | 62/222 |
| 4,047,394 | 9/1977 | Severigns et al. | 62/502 |
| 4,152,903 | 5/1979 | Longsworth | 62/222 |
| 4,177,650 | 12/1979 | Campbell | 62/222 |
| 4,237,699 | 12/1980 | Longsworth et al. | 62/514 JT |
| 4,381,652 | 5/1983 | Kunimoto | 62/51.2 X |
| 4,468,935 | 9/1984 | Albagnac | 62/514 JT |
| 4,631,928 | 12/1986 | Walker | 62/514 JT |
| 4,681,297 | 7/1987 | Mertz | 251/45 |
| 5,117,647 | 6/1992 | Valbjorn | 62/222 |
| 5,181,386 | 1/1993 | Brown | 62/51.2 |
| 5,182,920 | 2/1993 | Matsuoka et al. | 62/206 |
| 5,257,737 | 11/1993 | Vestergaard | 236/92 B |
| 5,313,801 | 5/1994 | Bonney | 62/51.2 |

FOREIGN PATENT DOCUMENTS

| | | |
|---|---|---|
| 702220 | 12/1979 | U.S.S.R. |
| 807001 | 2/1981 | U.S.S.R. |
| 1693326 | 11/1991 | U.S.S.R. |

*Primary Examiner*—Harry B. Tanner
*Attorney, Agent, or Firm*—Helfgott & Karas, P.C.

[57] ABSTRACT

An integral combination of expansion valve and evaporator in a cryostat using a single support member. The valve includes two flow orifices, one orifice being used primarily for steady-state operation and the other orifice being used only during cool-down. An actuator having a high coefficient of thermal expansion moves a needle positioned in the cool-down orifice such that a large orifice flow area at the start of cool-down is automatically and continuously reduced as the actuator temperature decreases as refrigerant is throttled through the orifice. Within a range of approximately 30 K from the desired steady-state evaporator temperature, the needle completely blocks the cool-down orifice. Then, refrigerant flows through the steady-state orifice which has a remotely adjustable needle. In the final stage of cool-down, the refrigerant system is entirely controlled by the steady-state orifice and its associated needle. In other embodiments, the steady-state orifice and adjusting needle, are replaced with a fixed restrictor, such as a capillary tube, that is positioned in parallel with the cool-down orifice and needle. The fixed restrictor is sized to satisfy the desired steady-state operating conditions.

40 Claims, 11 Drawing Sheets

CLOSED CYCLE CRYOGENIC REFRIGERATION SYSTEM WITH AUTOMATIC VARIABLE FLOW AREA THROTTLING DEVICE

BACKGROUND OF THE INVENTION

This invention relates generally to a closed cycle cryogenic refrigeration system, and more particularly concerns refrigerant throttling devices having automatically variable flow areas.

Figure 1:
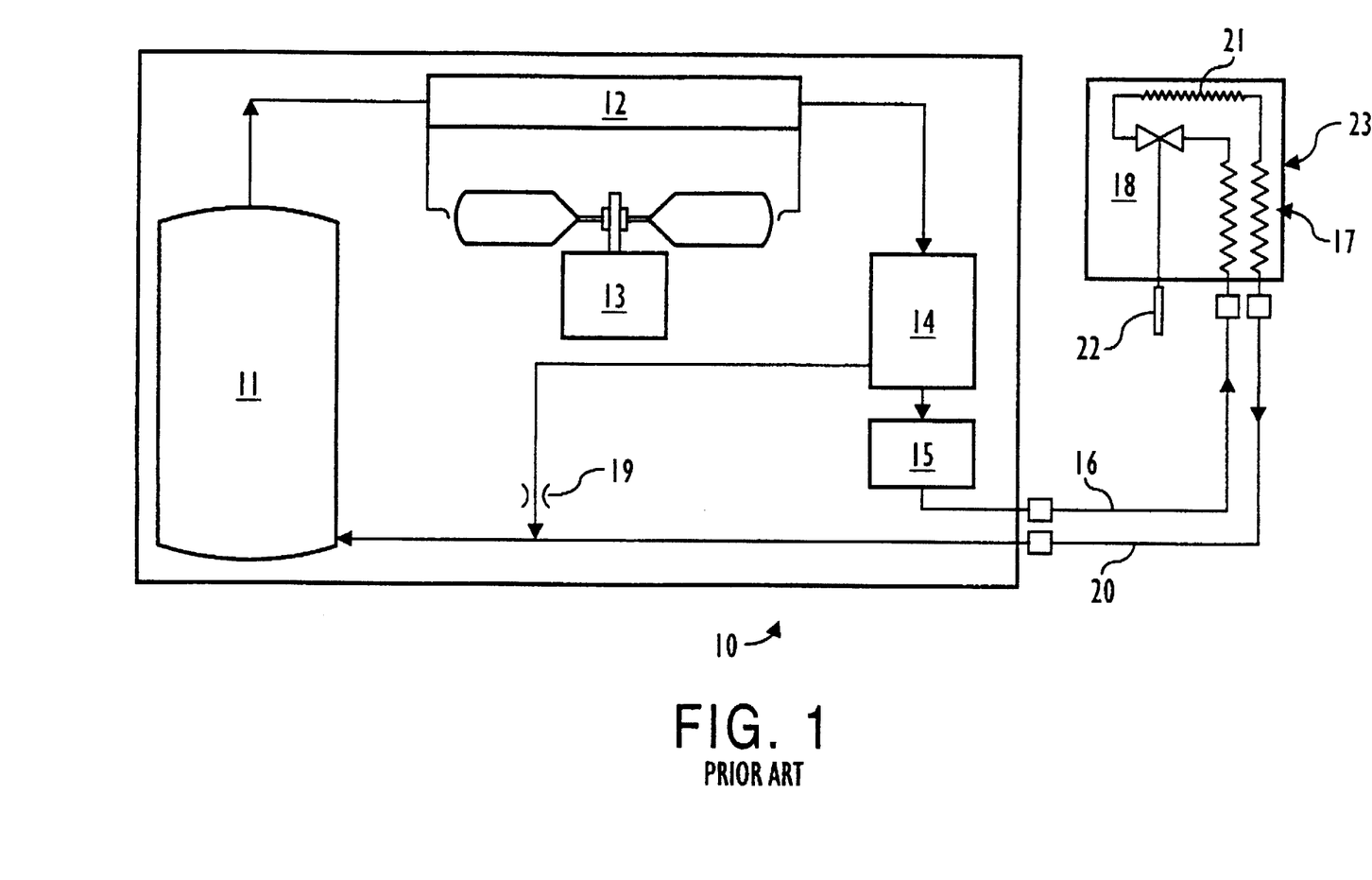
FIG. 1 is a schematic of a prior art closed cycle cryogenic refrigeration system for a mixed refrigerant, including a manually adjustable expansion device.

FIG. 1 is a schematic of a closed cycle cryogenic refrigeration system 10 that was described in a paper, 80 K Closed Cycle Throttle Refrigerator, presented at the International Cryocooler Conference on Jun. 29, 1994, this paper being incorporated herein by reference. The refrigeration system 10 utilizes an oil lubricated compressor 11 connected at its discharge or high pressure end to an aftercooler 12 having its outlet connected to an oil separator 14. Oil from the oil separator 14 flows by way of a metering device 19 to the low side of the compressor 11.

Refrigerant from the oil separator 14 flows through an adsorber 15 and connects by a first line 16 to the high pressure inlet side of a regenerative heat exchanger 17. The adsorber 15 removes moisture from the refrigerant stream that may be present in the system and its components, as manufactured. The high pressure outlet of the regenerative heat exchanger 17 connects to the inlet of an adjustable throttle valve 18. An evaporator 21 connects between the discharge side of the throttle valve 18 and the low pressure side of the heat exchanger 17. The discharge end of the regenerative heat exchanger 17 connects by a second connecting line 20 to the low pressure inlet of the compressor 11 to complete the cycle.

The oil separator 14 is used downstream of the compressor 11 so as to remove liquid oil, pumped by the compressor as a lubricant, from the refrigerant flow stream that passes ultimately through the evaporator 21. Excess amounts of oil in the evaporator 21 affect heat transfer in the evaporator and would diminish the capacity of the cycle.

In order to minimize cool-down time at the evaporator 21, it is necessary to start with a large orifice opening in the throttle valve 18 and to continuously close this valve in order to maintain a nearly constant return pressure to the compressor of about 0.3 Mpa when cooling from start-up at room ambient conditions to a steady-state cryogenic operating temperature. For example, a needle valve serving as the throttle valve 18 may be set at 15 turns open at the start of cool-down and be set at only two turns open at the end of cool-down.

Figure 2:
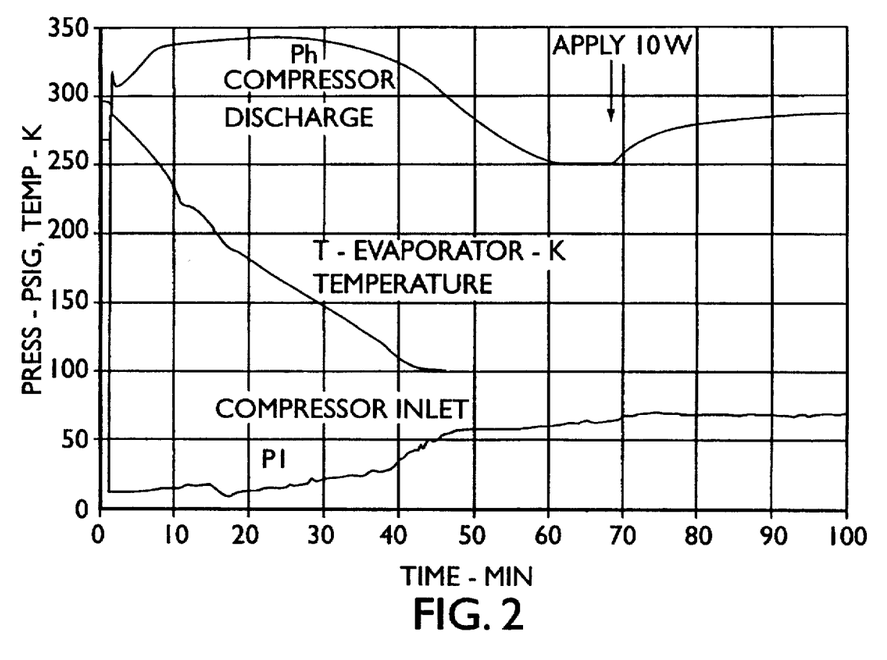
FIG. 2 is a graph of performance characteristics of a system as in FIG. 1 during cool-down and steady-state operation.

FIG. 2, taken from the above referenced paper, illustrates cool-down in a system with a fixed valve setting. However, cool-down would be faster if the orifice area of the throttle valve 18 were large and then was reduced during cool-down. In FIG. 2, T represents evaporator temperature; Ph is compressor discharge pressure, and P1 is the low pressure at the inlet to the compressor 11.

After cool-down, the orifice area of the valve 18 may be adjusted to establish a desired operating temperature in a range of about 80 to 100 K for a refrigerant mixture as described in the paper.

Figure 3:
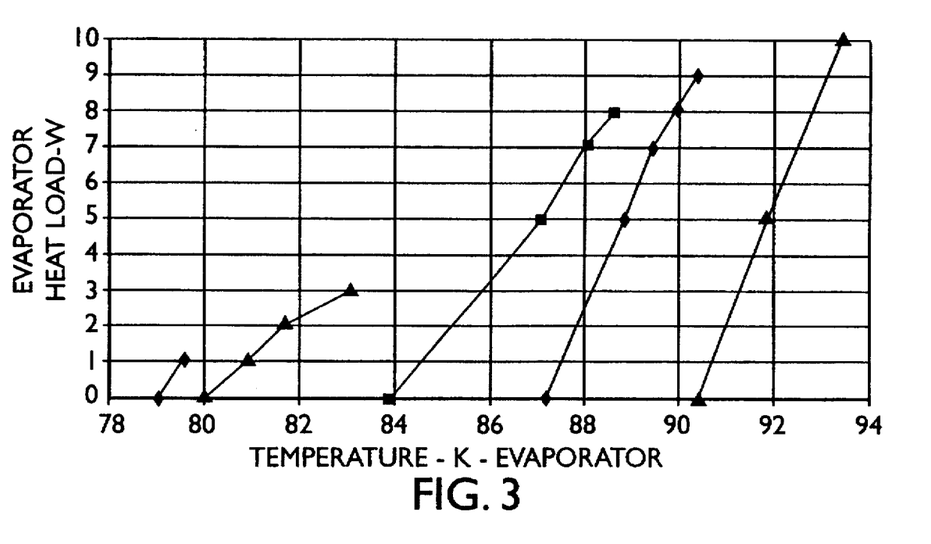
FIG. 3 is a chart of capacity versus evaporator temperature for the system of FIG. 1 for different orifice settings of an expansion device.

FIG. 3, also taken from the above-referenced paper, shows the relationships between heat load in the evaporator and evaporator temperature for different settings of the valve 18. The curve on the left side of FIG. 3 is for the smallest orifice setting during test and the curve on the right side of the graph is for the largest orifice used during the test. Reducing the orifice area in the valve 18 results in a lower flow rate of refrigerant that causes a reduction in the return pressure to the compressor 11. This lower pressure in turn reduces the temperature at which a mixed refrigerant boils. The lower flow rate also reduces the maximum rate of refrigeration.

A problem arises in that it is difficult to adjust the throttle valve 18 using a remote handle 22 that is located outside of the enclosure of the cryostat 23. The external handle 22 is a source of in-leakage of heat to the system and precise adjustment is frequently not repeatable. The result of an adjustment may not be immediately apparent, and there may be an undesirable lag between the adjustment and an intended result. As a result, a desirable smooth transition in temperatures upon making an adjustment is not always achieved.

A number of automatic control mechanisms have been developed for open cycle Joule-Thomson coolers (JT) that might be considered for a closed cycled application. However, important differences exist between the open circuit type system and the closed cycle system. Conventional open cycle JT coolers operate from bottles of high pressure gas, e.g. nitrogen at 40 Mpa (6,000 psig). This gas is throttled to produce a low temperature at lower pressure. The low temperature gas, partially liquified by throttling, passes through an evaporator and is then vented to atmospheric ambient. A back-pressure valve at the discharge generally determines the evaporator temperature.

Control mechanisms for JT coolers have also been developed to provide high flow rate for fast cool-down, followed by throttled flow after cool-down to reduce steady-state gas consumption in the open circuit systems. As stated, operating temperature is set primarily by the atmospheric vent pressure. When the orifice area remains constant during cool-down, the flow rate of refrigerant increases proportionally to $T^{-\frac{1}{2}}$, a factor of 1.7 when the temperature changes from 300 K (room ambient) to 100 K. Gas always enters the restrictor valve, and the gas temperature is typically 20 K to 60 K warmer than the fluid that exits the valve.

Then, after cool-down, the valve flow area is typically reduced to 1% to 3% of its initial area so as to reduce the gas consumption. Cool-down time has been found to be minimum by having a valve that remains essentially wide open during cool-down to approximately 100 K. Then, the valve flow area is reduced to reduce gas flow rate.

Figure 4:
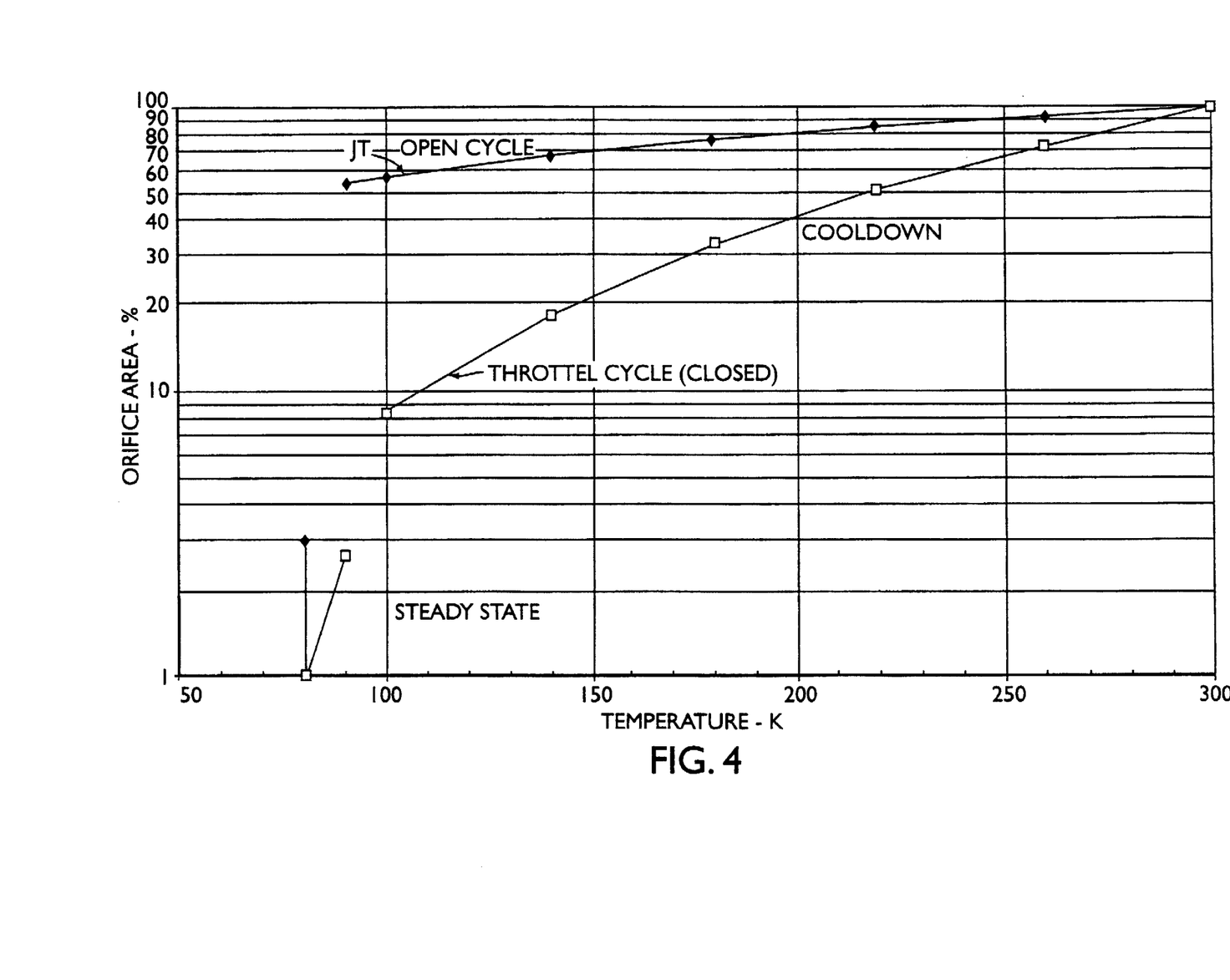
FIG. 4 is a chart of comparative cool-down performance between open and closed cycle systems as the orifice area of the flow restrictor in the system is varied between set positions.

FIG. 4 presents a comparison of the relative valve flow areas that are preferred to optimize cool-down time for typical open cycle JT cryostats and closed refrigeration cycle cryostats. For the closed cycle, cool-down time is minimized if the valve area is reduced from a maximum during cool-down. At the start of cool-down 100% gaseous refrigerant flows through the valve, while at the end of cool-down, refrigerant is either entirely or nearly 100% liquid. This change in density from gas to liquid requires a large change in valve area to keep the mass flow rate nearly constant.

By the time the evaporator temperature is at 100 K, the orifice area has been reduced in excess of 90% from its original value in the closed cycle. It is then usually necessary to further reduce the valve area to reach the desired operating temperature for steady-state.

As illustrated in FIG. 4, the change in area that is required for preferred cool-down in an open cycle (JT) is in the order to 50–60%. Then, a steady-state setting is made that is very similar to the setting in the closed cycle.

As stated, it is the pressure held in the evaporator before the refrigerant vents to atmosphere in an open cycle that determines the evaporator temperature. Varying the orifice in the JT control mechanisms controls the refrigerant flow rate in steady-state operation but does not control the temperature. To the contrary, in a closed cycle, when the orifice is adjusted it is primarily to reset the temperature in the evaporator and not the flow rate.

Thus, in an automatic open circuit JT cryostat, an increase in evaporator temperature causes the throttle valve to open and increase the flow rate. This increases the refrigeration effect and brings the temperature back to a desired level. In a closed cycle refrigerator, an increase in temperature at the evaporator, if accompanied by a refrigerant flow increase, would cause the temperature to increase even more as the compressor would operate at a higher inlet pressure to accommodate an increased mass flow of refrigerant. Therefore, in a closed cycle refrigeration system, for fast cool-down, the control mechanism, i.e., the adjustable throttle device, must start with a large orifice and reduce the flow rate during cool-down. Then the orifice must be set to a fixed position to maintain a nearly constant flow rate for steady-state operation of the system.

Other factors being substantially constant, a higher return pressure at the compressor inlet translates into a higher mass flow of refrigerant that results in a higher cooling rate. Therefore, a flow restrictor with a large orifice at the commencement of cool-down allows for a higher return pressure at the compressor than would exist if the orifice were preset, fixedly, to satisfy the desired steady-state conditions. Thereby, a valve that reduces flow area during cool-down provides a higher average return pressure at the compressor during cool-down for a given gas mixture, and cool-down will be faster than would be provided with a fixed restrictor.

What is needed is an automatic throttling device that has a continuously variable flow area during cool-down so as to minimize cool-down time, and holds a preset minimum flow area that will maintain desired operating temperatures after cool-down.

SUMMARY OF THE INVENTION

Accordingly, it is an object of the invention to provide an improved refrigerant flow control valve for a mixed refrigerant in a closed cryogenic system that is automatically adjustable during cool-down and holds the evaporator temperature at a low steady-state condition.

A further object of the invention is to provide an improved refrigerant flow control valve for a mixed refrigerant in a closed cryogenic system that allows for external setting of steady-state temperature, and provides automatic adjustability during cool-down.

Yet another object of the invention is to provide an improved refrigerant flow control valve for a mixed refrigerant in a closed cryogenic cycle that reduces cool-down time by providing a large flow orifice at start up, the orifice being automatically and continuously reduced to bring the evaporator temperature to within 30 K of desired steady-state operational conditions.

Still another object of the invention is to provide an improved refrigerant flow control valve for mixed refrigerant in a closed cryogenic system that provides a variable flow area during cool-down and a fixed or manually adjustable flow area during steady-state operation.

An assembly in accordance with the invention provides an integral combination of expansion valve and evaporator, which may be positioned in a cryostat using a single support member. The valve includes two flow orifices, one orifice being used primarily for steady-state operation and the other orifice being used only during cool-down. An actuator having a high coefficient of thermal expansion moves a needle positioned in the cool-down orifice such that a large orifice flow area at the start of cool-down is automatically and continuously reduced as the temperature of the actuator decreases as a result of refrigerant throttled through the orifice. Within a range of approximately 30 K from the desired steady-state evaporator temperature, the needle completely blocks the cool-down orifice. Then, refrigerant flows through the steady-state orifice which has a needle that is adjustable from an external position, e.g., outside a cryostat. In the final stage of cool-down, after the cool-down orifice is entirely closed, the refrigerant system using the throttling device in accordance with the invention is entirely controlled by the second or steady-state orifice and its associated needle.

In other embodiments in accordance with the invention, the steady-state orifice and its adjustable needle, are replaced with a fixed restrictor, such as a capillary tube, that is positioned in parallel with the cool-down orifice and needle. The fixed restrictor is sized to satisfy the desired steady-state operating conditions.

In yet another construction in accordance with the invention, both cool-down and steady-state flow of refrigerant passes through the same orifice. The mechanism is constructed such that a minimum fixed flow area is achieved at the orifice before cool-down is complete without entirely closing off refrigerant flow.

The actuator may be a known plastic, metal or bimetal element that has a high thermal coefficient of expansion relative to other elements in the valve assembly. Also, the actuator may be a gas filled bellows having a length that is responsive to changes in temperature.

Other objects, features and advantages of the invention will in part be obvious and will in part be apparent from the specification. This invention accordingly comprises the features of construction, combinations of elements and arrangements of parts, which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 5:
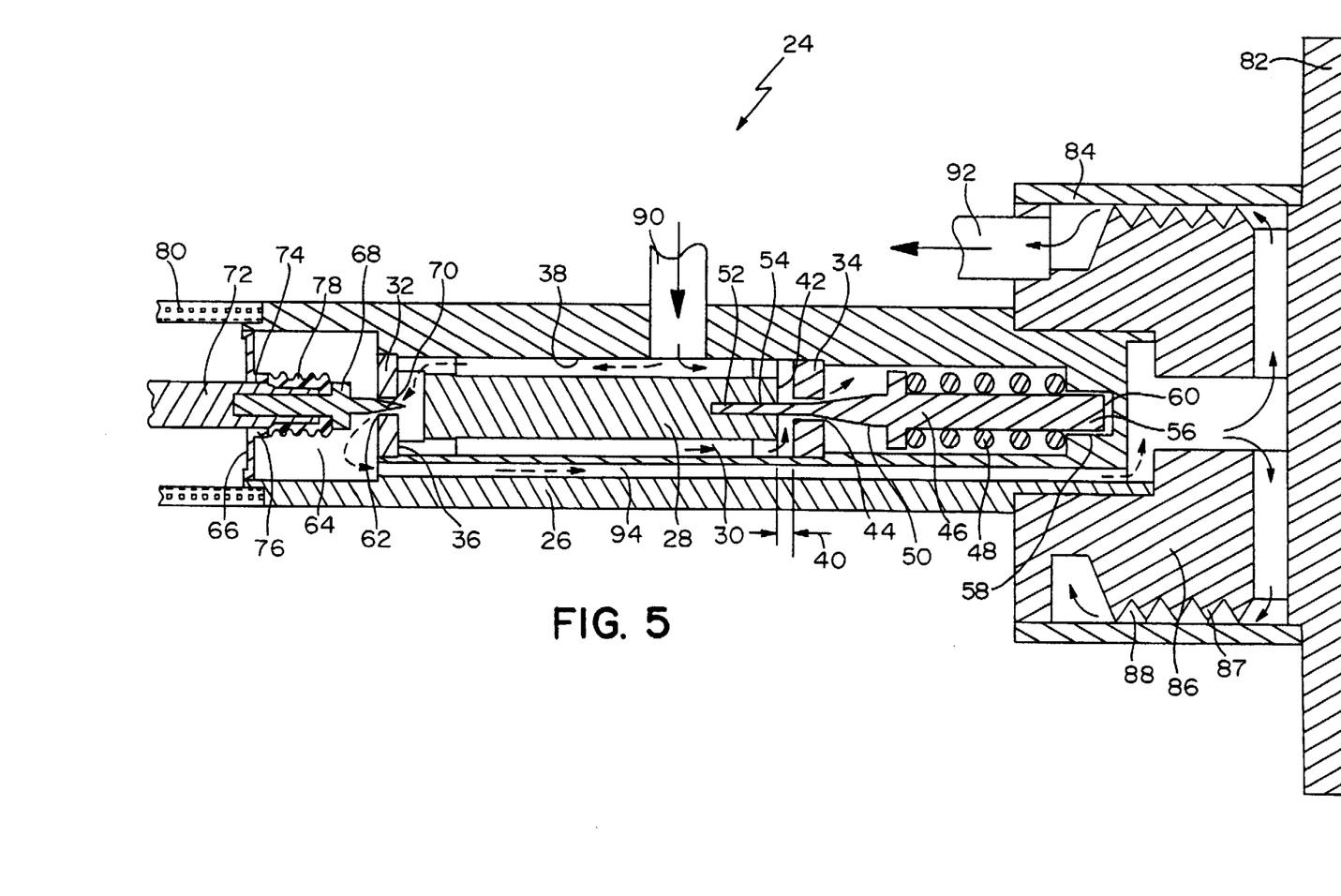
FIG. 5 is an integral restrictor valve and cold plate assembly, in accordance with the invention, having two refrigerant flow orifices.

FIG. 5 is an automatic expansion valve 24 of a double orifice design. This valve 24 would replace the throttle valve 18 (FIG. 1) in a closed cycle cryogenic system in accordance with the invention.

The valve 24 includes a valve body 26 made of a rigid material, preferably metal, having a low thermal coefficient of expansion.

A linear expansion element or actuator 28 is contained in a cavity 30 of the valve body 26, the cavity being defined by a partition 32 at one end and a partition 34 at the other end. The expansion element 28 abuts the partition 32 along an annular surface 36 and has a sliding fit with the inner surface 38 of the cavity 30. A gap 40 separates an end surface 42 of the expansion element 28 from the partition 34. The expansion element 28 is made of a known plastic (e.g. Kel F), high expansion metal (e.g. Kovar), bi-metal, and the like, which have high coefficient of expansion relative to that of the body 26, so that the actuator length between the partitions 32, 34 is a variable with temperature, whereby the gap 40 is also variable.

A first orifice 44 passes through the partition 34 and a needle 46, biased by a spring 48, extends a tapering surface 50 into the orifice 44. A cylindrical tip 52 of the needle 46 seats into a corresponding cylindrical blind recess 54 that penetrates the end surface 42 of the expansion element 28. The opposite end 56 of the needle 46 is received in a socket 58 of the body 26 with end clearance 60. An annular flow area exists between the needle 46 and the orifice 44.

In operation, linear contraction of the actuator element 28 due to a decrease in temperature thereof forces the tapered surface 50 to the left (FIG. 5) as the spring 48 expands and the needle 46 moves more deeply into the orifice 44. The annular flow area, frequently stated herein as the "orifice flow area", is decreased. The needle 46 is fabricated of material similar to that of the body 26, having a low thermal coefficient of expansion.

A second orifice 62 passes through the partition 32 and connects the cavity 30 with a cavity 64 that is closed at its other end by a partition 66.

A second needle 68 extends a tapered surface 70 through the orifice 62 and is supported on the partition 66 by a valve adjustment stem 72 that threadably engages at 74 with a collar 76 on the partition 66. A bellows type seal 78 engages the needle 68, stem 72 and partition 66, to prevent out-leakage of high pressure refrigerant from the expansion valve 24.

In use in a cryostat (not shown), the stem 72 extends to the warm exterior of the cryostat where the stem may be manually adjusted so that the position of the needle 68 in the orifice 62 is controllable. The valve body 26 is supported in the cryostat from an insulating support structure 80, e.g., a known glass reinforced composite, G10.

The right end (FIG. 5) of the body 26 connects to a cold plate 82 and to a highly conductive cylinder 84 that extends from the cold plate 82 and is part of the evaporator assembly. An externally threaded plug 86 is sealed within the cylinder 84 with the threads 87 fitting against the inner surface of the cylinder 84 to create a spiral passage 88 for refrigerant flow, as explained hereinafter. The single member 80 supports both the restrictor valve and cold plate in an integral structure.

An inlet tube 90 passes through a wall of the body 26 to provide entrance for refrigerant into the cavity 30, and a discharge or outlet tube 92 allows for exit of refrigerant from the coldest portion of the system after the refrigerant flows through the spiral passage 88.

When connected into a system such as FIG. 1, the high pressure inlet tube 90 connects to the high pressure outlet of the heat exchanger 17, and the low pressure outlet tube 92 connects to the inlet of the evaporator 21. The cold plate 82, cylinder 84 and plug 86 in FIG. 5, correspond to the evaporator 21 in FIG. 1.

In manufacture, the expansion element 28 and needle 46 are dimensioned such that at ambient conditions prior to start up, the spring loaded needle 46 provides the desired maximum flow area through the first orifice 44. When high pressure refrigerant entering through the inlet tube 90 flows through the orifice 44, its pressure drops as well as its temperature as the refrigerant expands. In a short time, the entire assembly including the actuator element 28 is chilled. As the actuator element 28 becomes colder, it contracts longitudinally and the spring 48 forces the needle 46 to the left (FIG. 5) in a gradual and continuing process until the orifice 44 is entirely plugged by the needle 46. This complete orifice closure occurs as the temperature of the cold plate approaches, within a range of approximately 30 K, the desired evaporator temperature for steady-state operation.

The solid arrows (FIG. 5) indicate the flow directions of the refrigerant during cool-down through the inlet 90, through the orifice 44, past the cold plate 82 inner surface, through the spiral passage 88, and from the outlet tube 92.

After the orifice 44 is entirely plugged, refrigerant can flow (broken line arrows) from the inlet tube 90 to the left (FIG. 5), through the orifice 62, into the cavity 64, and then through an elongated passage 94 in the body 26, toward the cold plate 82, cylinder 84, and threaded plug 86. The orifice 62 may have been preset to a position maintained during cool-down or the needle 68 may be adjusted after cool-down is complete. The effective orifice opening at 62 is established for steady-state operation and provides considerably less flow area than the initial flow area at the orifice 44 at the start of cool-down.

Figure 6:
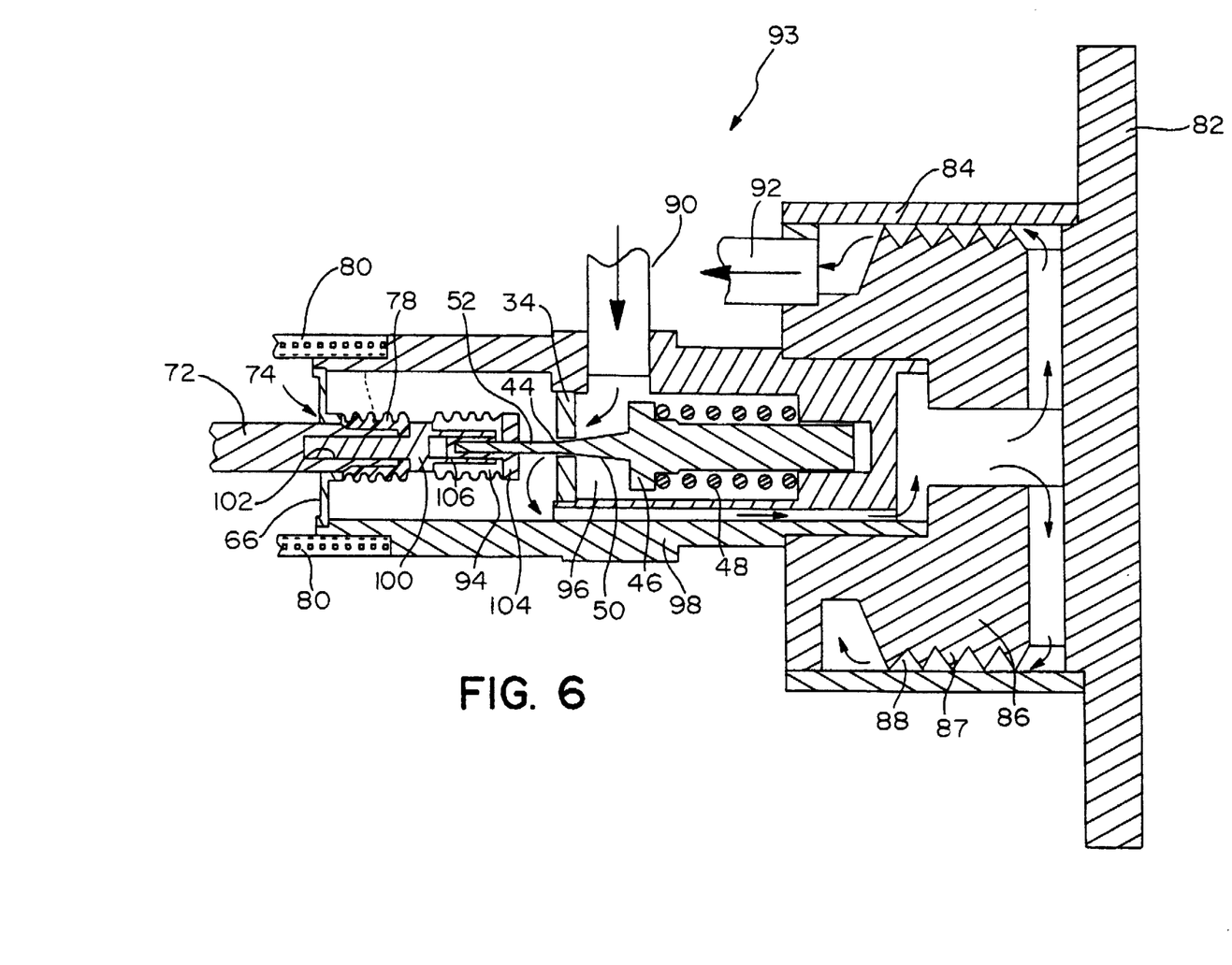
FIG. 6 is an alternative embodiment of an integral valve and cold plate, having a single restrictor orifice.

FIG. 6 is an embodiment of an automatic throttling device in accordance with the invention wherein there is a single orifice used for both cool-down and also steady-state operation. The actuator element 28 of FIG. 5 is replaced with a gas filled bellows 94 in the construction of FIG. 6. Elements that are common among the different embodiments presented herein have in many instances been given the same reference numerals.

In the automatic valve 93 of FIG. 6, the needle 46, biased by the spring 48, is in a cavity 96 within the valve body 98. The inlet tube 90 is on the side of the partition 34 where the spring 48 is located. Thus, flow of refrigerant through the orifice 44 is from right to left as illustrated in FIG. 6.

The valve adjustment stem 72 threadably engages at 74 the partition 66, and the seal 78 connects to the partition 66, stem 72, and a stop 100 that is seated in a recess 102 in the stem 72. A flanged piston 104 seats in a hollow cylindrical portion 106 of the stop 100 and gas filled bellows 94 act to separate the stop 100 from the piston 104. The cylindrical tip 52 of the needle 46 extends through the flange of the piston 104 and into a blind hole in the piston 104.

In operation, the bellows 94 expands and contracts in response to changes in its temperature. Thereby, the position of the needle 46 in the orifice 44 is varied. When the assembly is warm prior to initiation of cool-down, the stem 72 is rotated at its threadable connection 74 so as to set the desired flow opening for the orifice 44 at the start of cool-down. When refrigerant at high pressure enters the inlet tube 90, the refrigerant flows through the orifice 44 whereby its pressure drops; the refrigerant expands, and refrigerant temperature falls. In the process, the bellows 94 are cooled. The refrigerant flows as indicated by the arrows until the refrigerant has passed through the spiral passage 88 and finally reaches the outlet tube 92. In the process, the cold plate 82 and cylinder 84, which constitute the evaporator, are chilled and absorb heat from a load (not shown).

As the bellows 94 cool, the pressurized gas within the bellows is chilled; the bellows 94 contract and the piston 104, urged by the needle 46 and spring 48 sinks further into the cylinder 106 of the stop 100. Motion is limited when the flanged portion of the piston 104 abuts the end of the stop 100. This condition occurs when cool-down has advanced to approach, but has not yet achieved the desired evaporator temperature. At that time, the orifice 44 is only partially obstructed by the tapered surface 50 of the needle 46. This orifice status may be maintained during steady-state operation thereafter. Alternatively, the final setting of the orifice flow area size may be determined after cool-down by turning the stem 72. As in the earlier embodiment, the stem 72 extends from the cryostat and is accessible for manual operation. The integrated automatic restriction device 93/cold plate assembly 82–86 is supported in a cryostat (not shown) by a single insulating structure 80.

Figure 7:
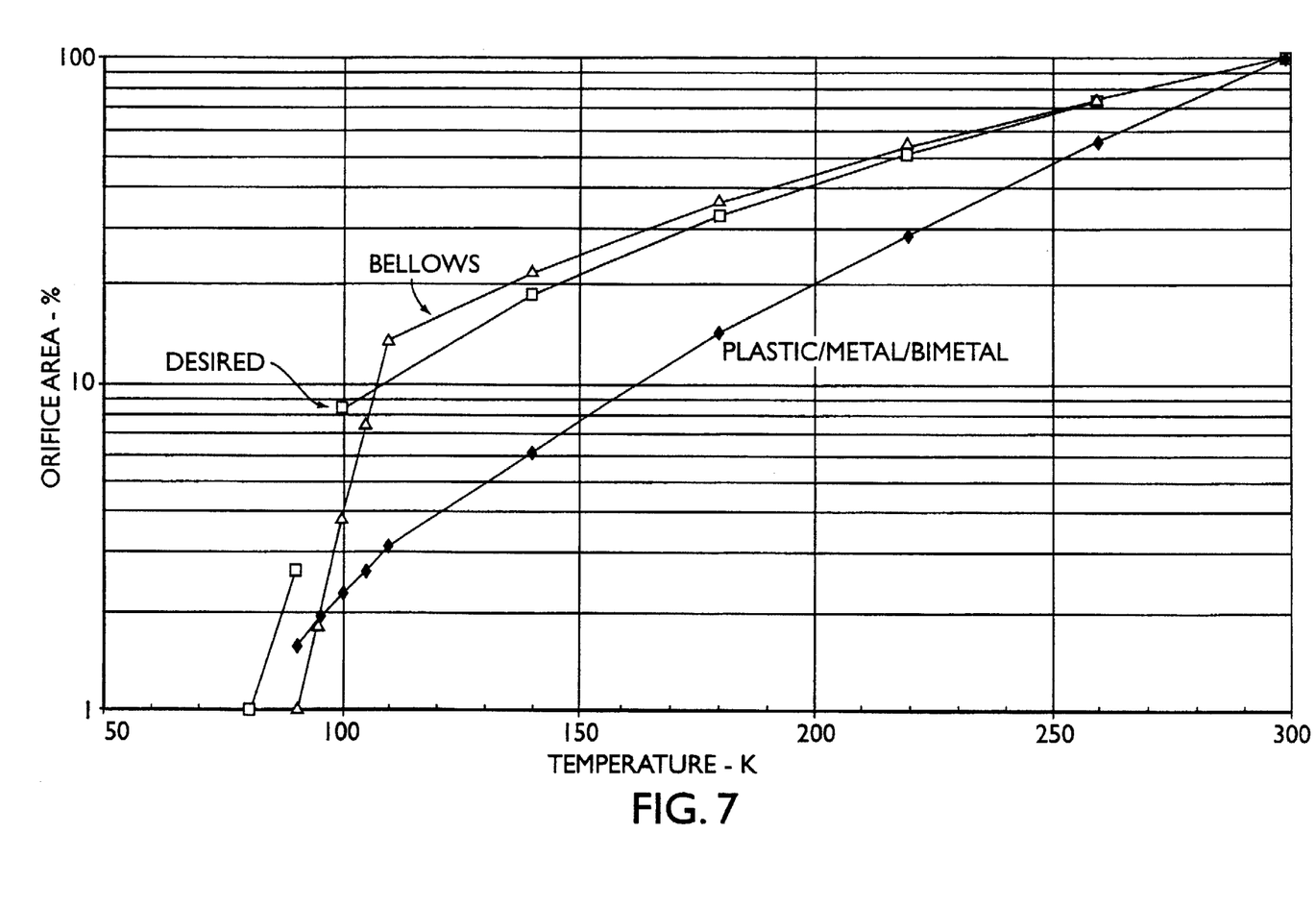
FIG. 7 is a graph of orifice area in percent versus evaporator temperature illustrating the effects of different actuator constructions.

FIG. 7 is a graph illustrating the effect of orifice area on evaporator temperature. The "desired" characteristic is one determined (FIG. 4) in performing cool-down on a system as in FIG. 1 wherein the restrictor 18 is manually adjusted so as to achieve an optimum cool-down time. The lower curve identifies performance using a throttle device with an expansion element 28 (actuator) as in FIG. 5 that is made of plastic or metal with a high coefficient of thermal expansion. The upper curve is for a throttle device as in FIG. 6, wherein a bellows actuator 94 is used. These plots assume straight tapered needles in a round orifice as in FIGS. 5, 6. The gas-charged bellows provide the better match with the desired flow area. Using a bi-metal actuator to move the needle provides approximately the same characteristics as the plastic/metal actuators.

Experiments have shown that the actuators, whether plastic or metal, exhibit sufficient variation with time that results are not satisfactorily and consistently repeatable with a single orifice in which the minimum flow area depends on the amount that the actuator contracts. For this reason the embodiment shown in FIG. 8 and described hereinafter is not a preferred embodiment because it relies on the use of materials that do not vary with time under the conditions of use, and satisfactory materials have not yet been developed for cryogenic applications.

Performance of the actuators changes in time for several reasons including dimensional changes that result from absorption and desorption of refrigerant by plastic actuators, yielding of bi-metal actuators, and gas loss from gas-charged bellows.

Thus, although more complex, a restrictor device with two orifices or restrictions, one for cool-down and the other for steady-state, can have performance advantages. Basically, an actuator that during cool-down automatically reduces the flow area to a fixed value, which occurs when the temperature is within approximately 30 K of the desired final steady-state operating temperature, provides the most practical effective mechanism. Tests indicate that a throttle device with such an actuator element that automatically produces a minimum flow area in the orifice and at the same time has brought the evaporator temperature within approximately 30 K of the desired steady-state level, can then be manually adjusted to the desired evaporator temperature without having a significant effect on cool-down time.

Figure 8:
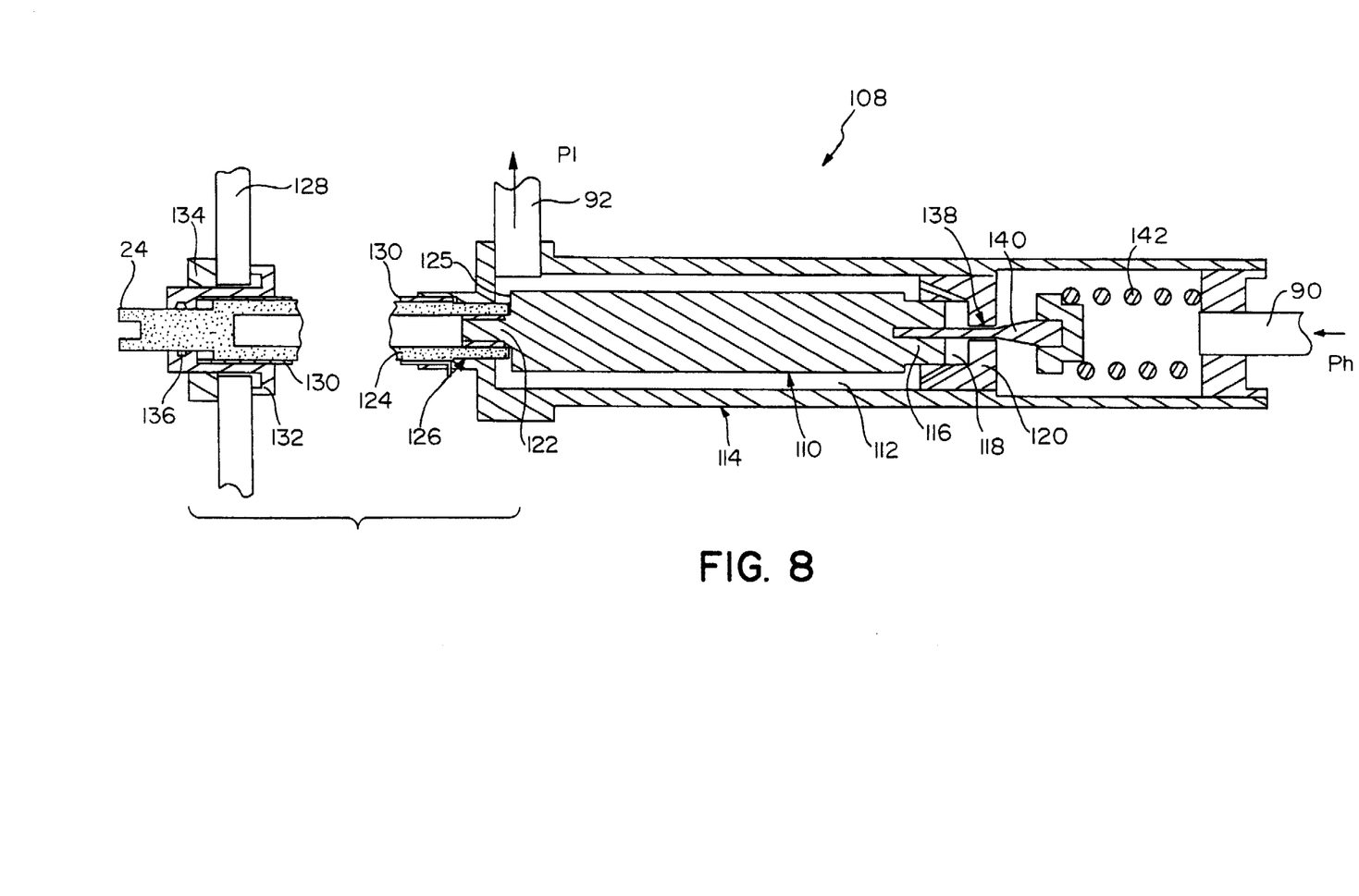
FIG. 8 is an alternative embodiment in accordance with the invention of a restrictor valve having a single orifice which is capable of external adjustment.

FIG. 8 is an alternative valve embodiment 108 in accordance with the invention. Whereas the embodiments of FIGS. 5 and 6 made the restriction device an integral part of the cold plate assembly, in FIG. 8 the throttle device 108 is not directly mounted on the cold plate. An actuator 110 of a material, as above, with a high thermal coefficient of expansion is mounted in a chamber 112 of the valve body 114. One end 116 of the actuator is slidably but non-rotatably received in a recess 118 of a fixed partition 120. The other end 122 of the actuator 110 is received in a hollow portion of a valve stem 124 that abuts a shoulder 125 on the actuator 110 and threadably engages a threaded opening 126 in the valve body 114. The valve stem 124 extends through a wall 128 of a cryostat and is surrounded by a thin sheath 130 that extends in a leak-tight assembly between the valve body and a fitting 132. The nut 134 holds the fitting 132 to the cryostat wall 128 in a conventional manner and an O-ring 136 provides a seal against the stem 124 that prevents escape of gas from the refrigerant system, and also would prevent any possible inflow of ambient air to the refrigerant system during operation or servicing when sub-ambient pressure may exist in the restrictor 108.

An orifice 138 in the partition 120 is partially blocked by the extended cylindrical end of a needle 140. As in all of the embodiments herein, an annular passage exists between the wall of the orifice 138 and the external surface of the needle 138. The needle 138 protrudes through the partition 120 to engage the end 116 of the actuator 110, and is spring-biased in that position.

Prior to the start of cool-down, the needle 140 is given a position in the orifice 138 to provide the maximum desired flow area. The actuator 110 may be moved to the right (FIG. 8) against the opposing force of the spring 142 by rotating the valve stem 124. In operation, high pressure refrigerant flows in through the inlet tube 90 and passes through the orifice 138 into the recess 118 at a lower pressure and temperature. From there, the refrigerant flows to the outlet tube 92. In the process, the actuator 110 is cooled and contracts, whereby the needle 140 is pushed by the spring 142 to the left (FIG. 8) to further restrict the orifice 138. The elements are dimensioned and the stem 124 is used to set the initial position of the needle such that when steady-state conditions are achieved, a desired minimum flow area is available for steady-state operation.

Steady-state operating conditions can then be adjusted by rotation of the valve stem 124. When the valve stem 124 is rotated in a direction to separate the stem from the actuator 110 where these two elements abut, the spring 142 urges the actuator 110 against the end of the valve stem. This construction has an advantage that the adjustment threads for the stem are at cryogenic temperatures; thereby the effects of changing external ambient temperatures are eliminated as an influence on the setting of the fixed valve flow area. Further, the O-ring 136, located in a warm external ambient, is effective in preventing possible escape of flammable refrigerant to the atmosphere.

It is noteworthy that use of the cold seals 78 in the embodiments of FIGS. 5 and 6 provides the seal at the expansion device and eliminates the need for the sheath 130 used in FIG. 8.

Figure 9:
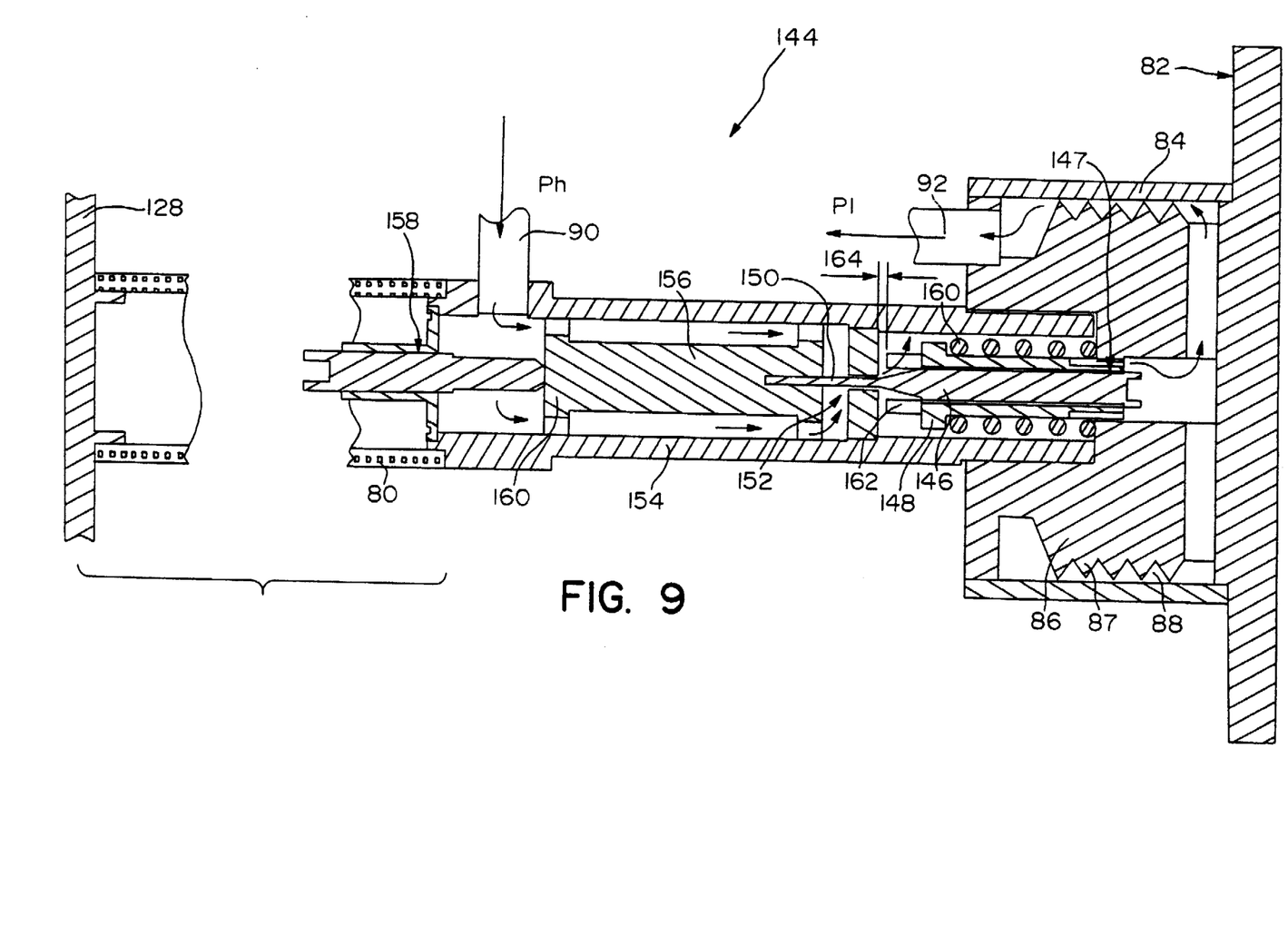
FIG. 9 is another alternative embodiment of an integral restrictor valve and cold plate in accordance with the invention, having a single orifice with two means for factory adjustment.

In the embodiment of a valve/cold plate 144 of FIG. 9, a needle 146 is threadably supported at 147 in a needle carrier 148. The cylindrical tip 150 of the needle extends through the orifice 152 within the valve body 154 and engages the actuator 156, as in the above embodiments. A threaded stem 158 engages the other end 160 of the actuator 156. Thus, a fixed position for the end 160 of the actuator 156 can be determined, preferably at the factory, by rotating the needle 146 and/or the stem 158 for providing a cool-down setting for the needle 146 in the orifice 152. The spring 160 assures that the actuator 156 is always fixed between the needle 146 and the stem 158.

When refrigerant flows in from the inlet tube 90 through the orifice 152 as indicated by the arrows, the actuator 156 is chilled and contracts. Thereby, the needle 146 and its carrier 148 are urged by the spring 160 to the left (FIG. 9) to further block the orifice 152. Stops 162, attached to the needle carrier 148, limit the motion of the needle toward the orifice 152 as the actuator 156 dimensionally contracts. A range 164 of motion is allowed from a setting at the start of cool-down to the steady-state position. A constant minimum flow area is always assured by the presence of the stops 162 and assures a fixed condition after cool-down.

Thus, the embodiment of FIG. 9 is factory adjustable for a cool-down setting starting with a large orifice flow area and finishing with a fixed smaller flow area at the orifice after cool-down, i.e., during steady-state operation.

As stated above, there is a degree of unpredictability in performance in restrictor valves that rely solely on temperature sensitive materials performing as actuators to set the final orifice flow area. There is a lack of complete repeatability in the steady-state orifice opening, which problem the stops 162 serve to correct.

Figure 10:
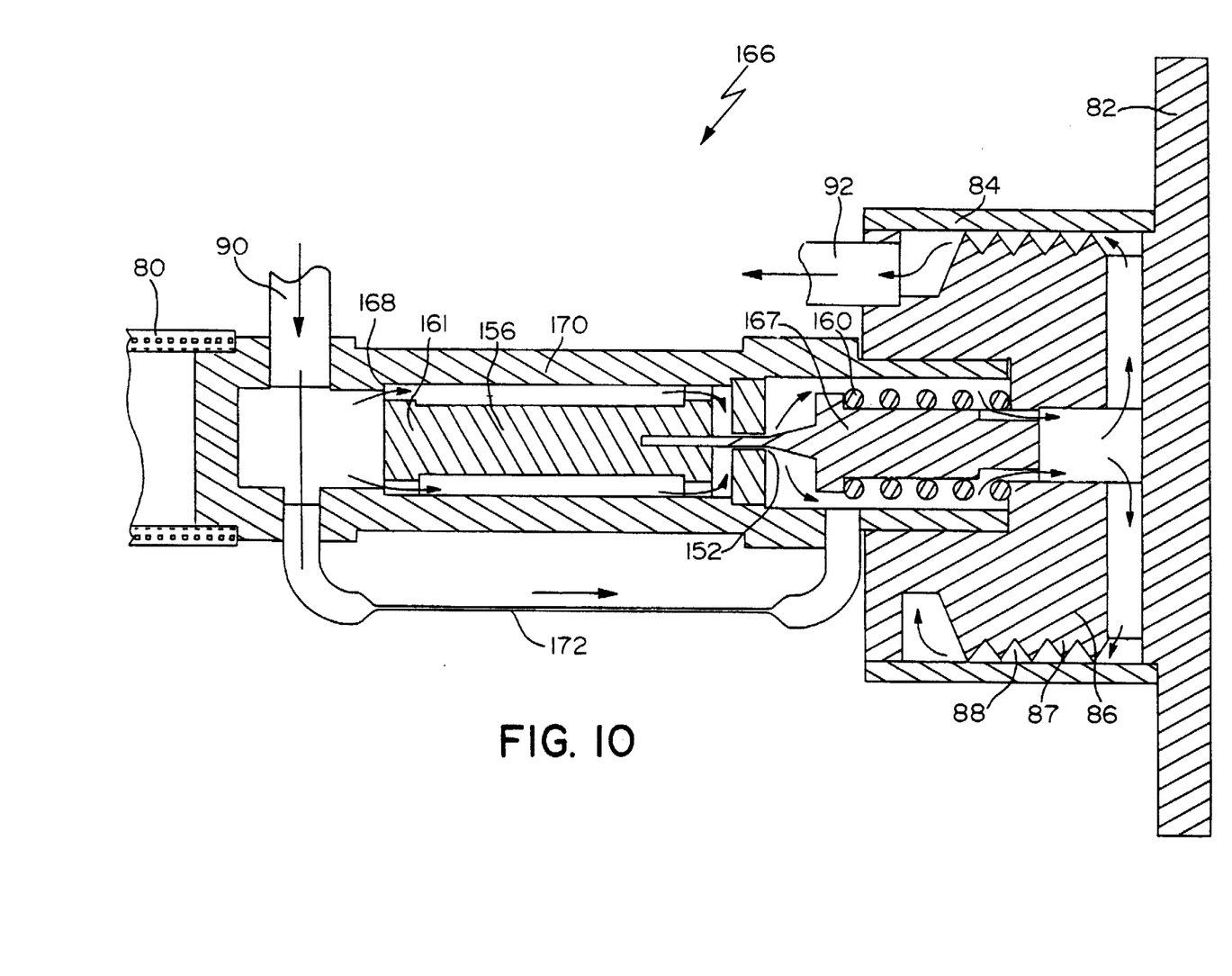
FIG. 10 is another embodiment in accordance with the invention of an integral restrictor valve and cold plate having a single orifice and a parallel fixed restrictor.

The assembly 166 (FIG. 10) which is similar to that of FIG. 9 with respect to the arrangement of the needle 167, orifice 152, and actuator 156, also addresses this difficulty, but in a different manner. In the embodiment of FIG. 10, there is no adjustability provided for setting the needle's position or the position of the actuator 156. The end 161 of the actuator 156 is fixed against a shoulder 168 in the valve body 170. The needle 167 and actuator 156 are dimensioned such that at ambient temperature, the needle 167 provides the maximum orifice flow area that is desired for the start of cool-down. As refrigerant flows through the orifice 152 and the entire assembly cools down, the actuator 156 contracts longitudinally and the needle 167 biased by the spring 160 advances to the left (FIG. 10) until the orifice 152 is completely blocked. By design, when the orifice closes, the evaporator temperature would be within a range of approximately 30 K from the desired evaporator temperature for steady-state operation. Although the orifice 152 is fully closed, refrigerant continues to flow from the inlet tube 90 through a fixed restrictor, here illustrated as a capillary tube 172, that is arranged in parallel with the orifice 152 and needle 167. Thereby, a fixed orifice is provided for steady-state operation.

The capillary tube 172 is sized for steady-state operation although some refrigerant can be expected to flow through the capillary tube even during cool-down. A typical capillary for a basic cryogenic refrigerant mixture would have 0.012 inch ID and an approximate 8 inch length. The dimensions of the needle 167 determine the initial orifice size at the commencement of cool-down and the selected capillary tube determines performance for steady-state. There is no adjustability provided in the field. The refrigerant flows to the outlet tube 92 by way of the spiral path 88 provided by the external threads 87 of the plug 86 whereby the cold plate 82 and the cylinder 84 are chilled and serve as an evaporator to absorb heat from a load (not shown), as described above.

In another embodiment 174 in accordance with the invention (FIG. 11), the needle 167 is slidably supported in an opening 176 in the plug 86 and is spring loaded toward the orifice as in the previously-described embodiments. The actuator is a gas-filled bellows 94 fixedly connected to the valve body 178 by means of the partition 180 at one end and at the other end connected to the flanged piston 182 that receives the extended needle tip in a blind opening in the center of the piston 182. A capillary tube 172 is connected in parallel with the orifice 152.

When refrigerant flows in from the inlet tube 90 through the orifice 152, there is a drop in pressure and temperature of the refrigerant that cools the entire assembly. The pressure within the bellows 94 is reduced, and, urged by the spring 160, the needle 167 advances to the left (FIG. 11) until the orifice 152 is completely plugged. Thus, the orifice area is reduced from its maximum prior to the start of cool-down to a closed position near completion of cool-down, i.e., in a range of approximately 30 K from the desired steady state evaporator temperature. Then, the capillary tube 172 provides a fixed flow restriction during steady-state operation. It should be understood that during cool-down the capillary 172 will also carry refrigerant.

Figure 11:
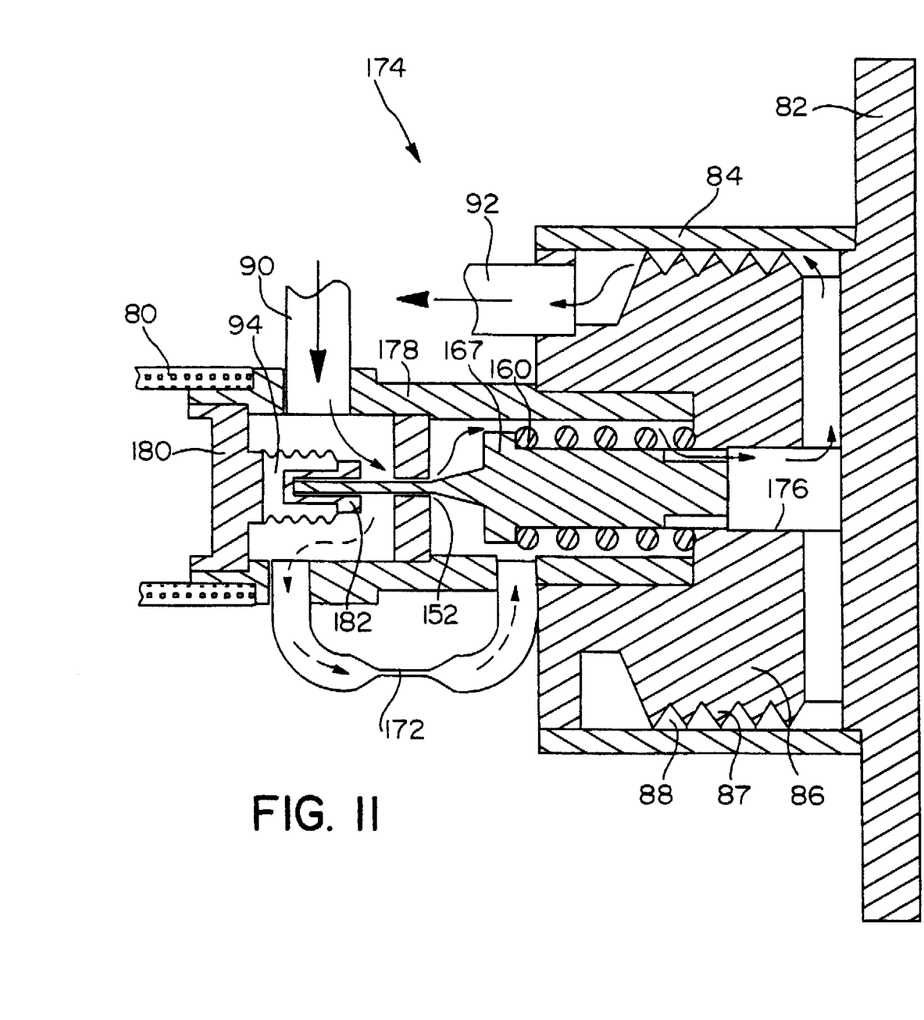
FIG. 11 is another embodiment in accordance with the invention, similar to FIG. 10 but having a gas-filled bellows actuator.

As illustrated, this embodiment allows for no adjustments after manufacture. Steady-state conditions are defined by selection of the capillary tube 172, and the initial pre-cool-down condition at the orifice 152 is determined by the physical dimensions of the mechanical elements and the selected gas pressure in the bellows 94. The cold plate 82 and the cylinder 84 are cooled in a manner as described above. Arrows indicate the direction of refrigerant flow from the inlet tube 90 to the outlet tube 92 during cool-down (solid) and at steady-state (dashed).

Figure 12:
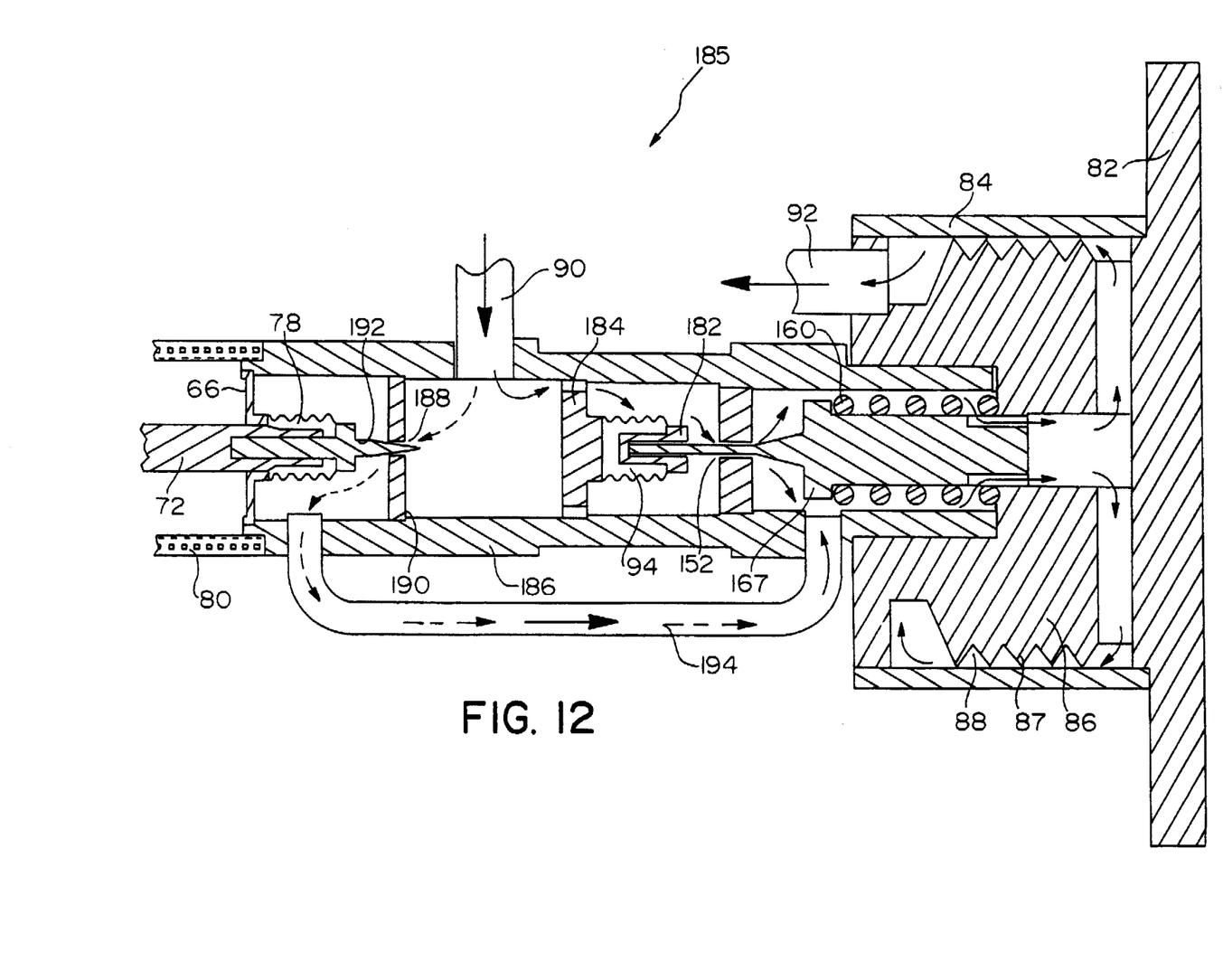
FIG. 12 is yet another alternative embodiment in accordance with the invention of an integrated restrictor valve and cold plate having a double orifice and using a bellows actuator.

FIG. 12 illustrates a double orifice construction of a restrictor device 185. The construction is basically similar to that in FIG. 5 except that in FIG. 12 a gas filled bellows 94 serves as the actuator, whereas in FIG. 5 a plastic/metal actuator 28 that had a high coefficient of thermal expansion, was used. The spring loaded needle 167 passes through the orifice 152 and is seated in the piston 182 mounted to the gas filled bellows 94 which in turn is connected to the fixed partition 184 in the valve body 186. This needle/orifice/ bellows portion operates during cool-down and is not adjustable. That is, the initial orifice flow area is preset at the maximum value for operation at the beginning of cool-down. The refrigerant flows from the inlet tube 90 through openings in the partition 184 and then through the orifice 152. Flow thereafter is as described above, through the spiral passage 88 of the plug 86 whereby the cold plate 82 and cylinder 84 are cooled to evaporator temperature before the refrigerant exits from the outlet tube 92.

During cool-down the pressure and temperature of the refrigerant drop as refrigerant flows through the orifice 152 whereby the entire mechanism is cooled. This cooling reduces the gas pressure in the bellows 94 whereby the spring 160 urges the needle 167 to the left (FIG. 12) until the needle seats and completely blocks the orifice 152. The elements are dimensioned so that this complete blockage of the orifice 152 occurs with the evaporator within approximately 30 K of the desired evaporator temperature.

At the end of cool-down, when the orifice 152 is blocked, refrigerant for steady-state operation flows through an orifice 188 that penetrates a second partition 190 fixed within the valve body 186. The orifice (188) opening is controlled by the second needle 192 that is connected to a valve adjustment stem 72, which extends to the outside of the cryostat (not shown), i.e., to warmer temperatures, where it may be operated to control the size of the flow orifice 188. The valve stem is threadably mounted in the partition 66 and thus may be advanced or retracted with a fine degree of control. The needle 192 is sealed to the partition 66 and to the valve stem 72 by a bellows type seal 78 whereby leakage of refrigerant to the external ambient from the refrigerant system is prevented.

The needle 192 is set for steady-state operation. Setting of this needle 192 can be done prior to cool-down or setting may be effected after the cool-down orifice 152 is closed, with the evaporator within approximately 30 K of the desired evaporator temperature.

Refrigerant flowing through the orifice 188 after cool-down passes through the external by-pass tube 194, which is not a restriction to refrigerant flow.

In alternative embodiments in accordance with the invention, the orifices, per se, may not have cylindrical wall surfaces; they may be non-round, tapered or have tapered inlets, etc. The needles may be tapered and/or non-round in cross section, etc.

In summary, in those embodiments of a restrictor valve wherein the cool-down orifice is closed or a mechanical stop is reached that holds a final orifice flow area, operation of the refrigerant system becomes independent of further contraction of the actuator even though the preferred design temperature for the evaporator is not yet achieved. The final stage of cool-down from the temperature at which the orifice that controlled cool-down becomes fixed in its flow area, is controlled by the fixed orifice area or by a second restrictor that takes over control of the system in the final stage of cool-down and in subsequent steady-state operation. The embodiments of FIGS. 5 and 9–12 are those that fix the cool-down orifice by either (a) completely closing its flow area at a temperature within approximately 30 K of the desired evaporator temperature or (b) are mechanically stopped so as to maintain a fixed orifice flow area as the temperature continues to drop to the steady-state value.

An object of enhancing cool-down performance as compared to a fixed area restrictor and of maintaining high repeatability and precision in performance are achieved by these constructions which fix the flow area for steady-state operation. Performance, depending upon the embodiment, may be completely automatic or in some constructions, the steady-state conditions are adjustable by means of an externally extended stem. The density of refrigerant and inlet pressure to the compressor are maintained at a higher level throughout the cool-down cycle by starting with a maximum flow area and gradually reducing the flow area as the evaporator temperature pulls down toward the design operating temperature. Thereby, compressor performance is enhanced. Cool-down is more rapid than with a fixed orifice flow area that is preset for steady-state operation.

It will thus be seen that the objects set forth above, and those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

What is claimed is:

1. In a closed cycle cryogenic refrigeration system using a mixed refrigerant, said system including an evaporator operating in a range from 70 K to 150 K for absorbing heat from a load, a refrigerant compressor receiving low pressure refrigerant and compressing said refrigerant to a high pressure, and first heat exchanger means for rejecting heat including compressor heat from said system, and second heat exchanger means for exchanging heat between a flow of low pressure refrigerant leaving said evaporator and entering said compressor, and a flow of high pressure refrigerant leaving said first heat exchanger means, the improvement therein comprising:

an automatic restrictor valve for receiving said high pressure refrigerant from said second heat exchanger, means for throttling said refrigerant to reduce pressure and temperature of said refrigerant, and delivering said reduced temperature refrigerant to an inlet of said evaporator, said valve including:

a first orifice for refrigerant flow therethrough to throttle said refrigerant and reduce said pressure and temperature;

first needle means for obstructing a flow area of said first orifice;

an actuator connected to said first needle means, said actuator being responsive to changes in temperature and moving said first needle means to reduce said first orifice flow area when said actuator temperature drops, said first orifice flow area in operation diminishing from a start of cool-down toward a steady-state operating temperature, said first orifice flow area no longer decreasing and remaining substantially constant in a predetermined range of temperature above said steady-state operating temperature.

2. A restrictor valve as in claim 1, wherein said predetermined range of temperature is approximately 30 K.

3. A restrictor valve as in claim 1, wherein said actuator is at least one of plastic, metal, bi-metal, and a gas filled bellows.

4. A restrictor valve as in claim 1, wherein said first orifice flow area in said predetermined range is substantially zero, said first needle means entirely blocking said first orifice, and further comprising:

a steady-state refrigerant flow path bypassing said first orifice and said first needle means, said steady-state flow path including one of a fixed restriction and a variable restriction.

5. A restrictor valve as in claim 4, wherein said fixed restriction is a capillary tube.

6. A restrictor valve as in claim 4, wherein said variable restriction is a second orifice and a second needle means positioned to obstruct a flow area of said second orifice.

7. A restrictor valve as in claim 6, wherein said second needle means is adjustable in its setting to vary said flow area of said second orifice, steady-state evaporator temperature being settable by selective positioning of said second needle means relative to said second orifice.

8. A restrictor valve as in claim 1, further comprising means for remotely controlling relative positions of said first orifice and first needle means.

9. A restrictor valve as in claim 8, wherein said means for remotely controlling include a valve stem connected to said first needle means via said actuator and threadably engaged with said restrictor valve, said first needle means moving relative to said first orifice to vary said first orifice flow area when said stem is rotated.

10. A restrictor valve as in claim 6, further comprising means for remotely controlling relative positions of said second orifice and second needle means.

11. A restrictor valve as in claim 10, wherein said means for remotely controlling include a valve stem connected to said second needle means and threadably engaged with said restrictor valve, said second needle means moving relative to said second orifice to vary said second orifice flow area when said stem is rotated.

12. A restrictor valve as in claim 11, wherein said threadable engagement is in a cold region of said valve.

13. A restrictor valve as in claim 11, further comprising a seal between said stem and said valve to prevent refrigerant escape at said stem, said seal being in one of said cold region of said valve and a warm region remote from said valve.

14. A closed cycle cryogenic refrigeration system using a mixed refrigerant, comprising:

an evaporator operating in a range from 70 K to 150 K for absorbing heat from a load;

a refrigerant compressor receiving low pressure refrigerant and compressing said refrigerant to a high pressure;

first heat exchanger means for rejecting heat including compressor heat from said system;

second heat exchanger means for exchanging heat between a flow of low pressure refrigerant leaving said evaporator and entering said compressor, and a flow of high pressure refrigerant leaving said first exchanger means;

an automatic restrictor valve for receiving said high pressure refrigerant from said second heat exchanger means, and for throttling said refrigerant to reduce the pressure and temperature of said refrigerant, and for delivering said reduced temperature refrigerant to an inlet of said evaporator, said valve including:

a first orifice for refrigerant flow therethrough to throttle said refrigerant and reduce said pressure and temperature;

first needle means for obstructing a flow area of said first orifice;

an actuator connected to said first needle means, said actuator being responsive to changes in temperature and moving said first needle means to reduce said first orifice flow area when said actuator temperature drops, said actuator being cooled by refrigerant flow, said first orifice flow area in operation diminishing from a start of cool-down toward a steady-state operating temperature, said first orifice flow area no longer decreasing and remaining substantially constant in a predetermined range of temperature above said steady-state operating temperature.

15. A refrigeration system as in claim 14, wherein said predetermined range of temperature is approximately 30 K.

16. A refrigeration system as in claim 14, wherein said actuator is at least one of plastic, metal, bi-metal and a gas filled bellows.

17. A refrigeration system as in claim 14, wherein said first orifice flow area in said predetermined range is substantially zero, said first needle means entirely blocking said first orifice, and further comprising:

a steady-state refrigerant flow path bypassing said first orifice and said first needle means, said steady-state flow path including one of a fixed restriction and a variable restriction.

18. A restrictor valve as in claim 17, wherein said fixed restriction is a capillary tube.

19. A restrictor valve as in claim 17, wherein said variable restriction is a second orifice and a second needle means positioned to obstruct a flow area of said second orifice.

20. A restrictor valve as in claim 19, wherein said second needle means is adjustable in its setting to vary said flow area of said second orifice, steady-state evaporator temperature being settable by selective positioning of said second needle means relative to said second orifice.

21. A refrigeration system as in claim 14, further comprising means for controlling said first orifice and first needle means.

22. A refrigeration system as in claim 21, wherein said means for controlling include a valve stem connected to said first needle means via said actuator and threadably engaged with said restrictor valve, said first needle means moving relative to said first orifice to vary said first orifice flow area when said stem is rotated.

23. A refrigeration system as in claim 20, further comprising means for remotely controlling said second orifice and second needle means.

24. A refrigeration system as in claim 23, wherein said means for remotely controlling include a valve stem connected to said second needle means and threadably engaged with said restrictor valve, said second needle means moving relative to said second orifice to vary said second orifice flow area when said stem is rotated.

25. A refrigerant system as in claim 24, wherein said threadable engagement is in a cold region of said valve.

26. A refrigerant system as in claim 24, further comprising a seal between said stem and said valve to prevent refrigerant escape at said stem, said seal being in one of said cold region of said valve and a warm region remote from said valve.

27. A restrictor valve for operation in a closed cycle cryogenic refrigeration system using a mixed refrigerant, said system operating in a range from 70 K to 150 K for absorbing heat from a load, said restrictor valve comprising:

an inlet for receiving high pressure refrigerant;

a first orifice for flow of high pressure refrigerant therethrough to throttle said refrigerant and reduce said pressure, said refrigerant becoming cooler as its pressure decreases;

first needle means for obstructing a flow area of said first orifice;

an actuator connected to first needle means, said actuator being responsive to changes in temperature and moving said first needle means to reduce said first orifice flow area when actuator temperature drops, said actuator being cooled by refrigerant flow, said first orifice flow area in operation diminishing from a start of cool-down toward a steady state operating temperature, said first orifice flow area no longer decreasing and remaining substantially constant in a predetermined range of temperature above a temperature selected as a steady-state operating temperature in said range of 70 K to 150 K.

28. A restrictor valve as in claim 27, wherein said predetermined range of temperature is approximately 30 K.

29. A restrictor valve as in claim 27, wherein said actuator is at least one of plastic, metal, bi-metal, and a gas filled bellows.

30. A restrictor valve as in claim 27, wherein said first orifice flow area in said predetermined range is substantially zero, said first needle means entirely blocking said first orifice, and further comprising:
    a steady-state refrigerant flow path bypassing said first orifice and said first needle means, said steady-state flow path including one of a fixed restriction and a variable restriction.

31. A restrictor valve as in claim 30, wherein said fixed restriction is a capillary tube.

32. A restrictor valve as in claim 30, wherein said variable restriction is a second orifice and a second needle means positioned to obstruct a flow area of said second orifice.

33. A restrictor valve as in claim 32, wherein said second needle means is adjustable in its setting to vary said flow area of said second orifice, steady-state evaporator temperature being settable by selective positioning of said second needle means relative to said second orifice.

34. A restrictor valve as in claim 27, further comprising means for remotely controlling relative positions of said first orifice and first needle means.

35. A restrictor valve as in claim 34, wherein said means for remotely controlling include a valve stem connected to said first needle means via said actuator and threadably engaged with said restrictor valve, said first needle means moving relative to said first orifice to vary said first orifice flow area when said stem is rotated.

36. A restrictor valve as in claim 32, further comprising means for remotely controlling relative positions of said second orifice and second needle means.

37. A restrictor valve as in claim 36, wherein said means for remotely controlling include a valve stem connected to said second needle means and threadably engaged with said restrictor valve, said second needle means moving relative to said second orifice to vary said second orifice flow area when said stem is rotated.

38. A refrigerant system as in claim 37, wherein said threadable engagement is in a cold region of said valve.

39. A refrigerant system as in claim 37, further comprising a seal between said stem and said valve to prevent refrigerant escape at said stem, said seal being in one of said cold region of said valve and a warm region remote from said valve.

40. A restrictor valve for operation in a closed cycle cryogenic refrigeration system using a mixed refrigerant, said system operating in a range from 70 K to 150 K for absorbing heat from a load, said restrictor valve comprising:
    an inlet for receiving high pressure refrigerant;
    a first orifice for flow of high pressure refrigerant therethrough to throttle said refrigerant and reduce said pressure, said refrigerant becoming cool as its pressure decreases;
    first needle means for obstructing a flow area of said first orifice;
    an actuator connected to said first needle means, said actuator being responsive to changes in temperature and moving said first needle means to reduce said first orifice flow area when actuator temperature drops, said actuator being cooled, said first orifice flow area in operation diminishing from a start of cool-down toward a steady state operating temperature, said first orifice flow area no longer decreasing and remaining substantially constant at a preselected steady-state operating temperature in said range of 70 K to 150 K.

* * * * *